United States Patent [19]

Funabiki et al.

[11] 4,058,403
[45] Nov. 15, 1977

[54] REFRACTORY COMPOSITIONS

[75] Inventors: Kyohei Funabiki; Tetsuya Tokunaga, both of Fujieda, Japan

[73] Assignee: Hooker Chemicals & Plastics Corporation, Niagara Falls, N.Y.

[21] Appl. No.: 639,679

[22] Filed: Dec. 11, 1975

[30] Foreign Application Priority Data

Nov. 12, 1975 Japan .................... 50-141476

[51] Int. Cl.$^2$ .................... C04B 35/52; C08L 97/00
[52] U.S. Cl. .................... 106/56; 260/17.2; 260/17.5
[58] Field of Search ............ 106/56; 264/29; 260/17.2, 17.5; 164/36

[56] References Cited

U.S. PATENT DOCUMENTS

| | | | |
|---|---|---|---|
| 1,187,869 | 6/1916 | Tarassoff .................... | 260/17.2 |
| 1,458,724 | 6/1923 | Ohman .................... | 106/56 X |
| 2,282,518 | 5/1942 | Hochwalt et al. ............ | 260/17.5 X |
| 2,722,522 | 11/1955 | Simonelli et al. ............ | 260/17.2 OR |
| 2,820,265 | 1/1958 | Kohl et al. .................... | 164/43 X |
| 2,956,033 | 10/1960 | Apel et al. .................... | 260/17.2 X |
| 3,227,667 | 1/1966 | Moffitt .................... | 260/17.2 X |
| 3,280,231 | 10/1966 | Bentolila et al. ............ | 106/56 X |
| 3,301,742 | 1/1967 | Noland et al. ............ | 264/29 X |
| 3,342,627 | 9/1967 | Paxton et al. ............ | 106/56 |
| 3,346,678 | 10/1967 | Ohlgren .................... | 106/56 X |
| 3,387,982 | 6/1969 | Rogers .................... | 106/56 |
| 3,442,670 | 5/1969 | Parsons .................... | 106/56 |
| 3,454,508 | 7/1969 | Herrick et al. ............ | 260/17.2 X |
| 3,567,807 | 3/1971 | Shannon .................... | 264/29 |
| 3,668,160 | 6/1972 | Horton et al. ............ | 164/43 X |
| 3,689,299 | 9/1972 | Brown et al. ............ | 106/56 X |
| 3,832,426 | 8/1974 | Malthouse et al. ............ | 106/56 X |
| 3,840,485 | 10/1974 | Brown et al. ............ | 106/56 X |
| 3,865,616 | 2/1975 | Akerblom .................... | 260/17.2 X |
| 3,929,695 | 12/1975 | Murata et al. ............ | 260/17.2 X |

*Primary Examiner*—Patrick P. Garvin
*Assistant Examiner*—William G. Wright
*Attorney, Agent, or Firm*—P. F. Casella; J. F. Mudd; W. G. Gosz

[57] ABSTRACT

Solid refractory compositions comprising an inorganic particulate refractory material and a carbonaceous binder therefor comprising a substantially carbonized phenol-aldehyde condensate resin chemically modified by reaction with lignin and/or molasses. The refractory compositions of the invention are characterized by an enhanced bending strength even at extreme elevated temperatures and a desirable diminished porosity compared to comparable refractory compositions having carbonaceous binders derived from conventional phenol-aldehyde resins.

11 Claims, No Drawings

REFRACTORY COMPOSITIONS

BACKGROUND OF THE INVENTION

The present invention relates to a refractory composition characterized by containing as a carbonaceous binder for refractories a modified phenolic resin obtained by condensing phenol with lignin and/or molasses and/or an aldehyde in the presence of an acid catalyst or a basic catalyst. Tars and/or pitches have mainly been used as carbonaceous binders for refractories. However, these binders have some demerits. For example, hardening of the binder is extremely slow and development of strength during the temperature elevation stage is poor. A strength as high as possible at high temperature is required of refractories, so refractory products having even a slightly higher quality than quality conventional ones are always being sought after demanded. Recently, since carbonaceous binders containing carcinogenic substances have posed a health problem, investigations of applying resins of high carbonization rate such as phenolic resins and furan resins have been made. However, they have not as yet been successful. In addition, the application of general phenolic resins, furan resins, lignins or molasses independently as binders have also been studied, but an additive giving a product with satisfactory refractory property has not been found.

SUMMARY OF THE INVENTION

It has now been found that the carbonaceous binder of the present invention is an excellent additive for carbonaceous refractories, since it is more inexpensive and it has a far higher carbonization rate and strength after carbonization as compared with conventional tars and pitches and general phenolic and furan resins. After intensive investigations, the inventors have obtained a carbonaceous binder having the above-described merits by chemically modifying a phenolic resin with a lignin and/or molasses.

DETAILED DESCRIPTION OF THE INVENTION

The carbonaceous binders according to the present invention are prepared by the following techniques:

1. Novolak type phenolic resin modified with lignin (typically lignin containing sodium, potassium and/or calcium ions), and/or molasses is obtained by adding from about 5 to at most about 300 parts by weight of a lignin such as sulfite pulp lignin or kraft pulp lignin (hereinafter referred to as "a lignin") and/or from about 5 to at most about 500 parts by weight of molasses to 100 parts by weight of a phenol such as phenol per se, cresol or other alkyl-substituted phenol having 1 to 4 carbon atoms in the alkyl group (hereinafter such phenol reactants being referred to as "phenol"); then, adding thereto, if desired, at most 0.9 mole of an aldehyde such as formaldehyde, acetaldehyde, butylaldehyde or furfural (hereinafter referred to as "an aldehyde") per mole of said phenol; reacting the mixture together under heating in the presence of an acid catalyst, for example, an organic acid such as common oxalic acid or p-toluenesulfonic acid, an inorganic acid such as hydrochloric acid or sulfuric acid or a "Lewis" acid such as aluminum chloride; and dehydrating the reaction product under atmospheric pressure or reduced pressure to obtain solid resin. To this solid resin is added about 1-25 parts by weight of hexamethylenetetramine as hardening agent, if desired, and then the mixture is pulverized to a carbonaceous binder powder. The powdered carbonaceous binder may be dissolved further in an organic solvent to obtain a liquid carbonaceous binder.

2. A novolak type phenolic resin modified with lignin and/or molasses can also be obtained by reacting a phenol with an aldehyde in the presence of a common acid catalyst, then adding a lignin or molasses to the phenolic resin, reacting the mixture together in the presence or absence of a common acid catalyst under heating; and dehydrating the product under atmospheric pressure or reduced pressure. Hexamethylenetetramine may be added to the product as a hardening agent, if desired, and pulverized to a powdered carbonaceous binder. The product may also be dissolved in an organic solvent to obtain a liquid carbonaceous binder.

3. A resolic phenolic resin modified with a lignin and/or molasses is obtained by adding from about 5 to at most about 300 parts by weight of a lignin and/or from about 5 to at most about 500 parts by weight of molasses to 100 parts by weight of a phenol, then adding thereto about 1-3 moles of an aldehyde per mole of said phenol; the mixture is reacted under heating in the presence of a common basic catalyst, for example, an inorganic base such as sodium hydroxide, potassium hydroxide or barium hydroxide or an amine such as ammonia or triethylamine. The product is then dehydrated under reduced pressure to obtain syrupy carbonaceous binder. If necessary, this binder is diluted with an organic solvent, typically using up to about 500 parts of solvent per 100 parts by weight of the binder resin. Conveniently, the amount of acid catalyst used is from about 0, preferably about 1, to about 10 parts per 100 parts by weight of the phenolic reactant and the amount of basic catalyst used is from about 1 to about 150 parts per 100 parts by weight of the phenolic reactant. In the preparation of a resolic phenolic resin modified with a lignin and/or molasses according to this invention, the lignin and/or molasses can be added at the beginning of the reaction. As for the refractory materials, inorganic materials such as silica, clay, alumina, carbon, magnesia and dolomite may be used. The refractory compositions are made into refractories of definite shape or used as sealants of spouts or as linings of electric furances, blast furnaces, converters etc.

The aforementioned condensations with lignin and/or molasses are carried out in aqueous media. Generally about 1 to 1000 parts by weight of water per 100 parts by weight of lignin and/or molasses extender reactant are employed. Methods for applying the modified phenolic resin of the present invention as a carbonaceous binder are illustrated below:

1. Water or water which contains a small amount of a surfactant, an organic solvent such as a lower alcohol ("lower" meaning of 1 to 4 carbon atoms), a lower glycol such as ethylene glycol, diethylene glycol and propylene glycol, an oil or fat or a plasticizer such as tricresyl phosphate is added as wetting or plasticizing agent to the powdered resin, obtained by pulverizing a mixture of the novolak type phenolic resin modified with lignin and/or molasses and mixing hexamethylenetetramine, is mixed with refractory material and made into a clay-like mass. The resulting mixture can be directly used as a refractory material for indefinite shpaes. If the mixture is molded with a press or the like and then dried or calcined under reduced pressure, refractories in definite shapes are obtained.

2. The same clay-like mass as above can be obtained by using a liquid resol type phenolic resin (e.g. an aqueous partially reacted resol resin) modified with a lignin and/or molasses as binder which, if desired, has been diluted with an organic solvent in the same manner as above.

3. A clay-like mixture can be obtained by using (a) a liquid resol type phenolic resin modified with a lignin and/or molasses and (b) a powdered resin obtained by mixing novolac type phenolic resin modified in the same manner and adding hexamethylenetetramine and pulverizing the mixture.

4. Refractories of definite shape are impregnated with novolac type phenolic resin modified with a lignin and/or molasses without solvent in molten state, under heating or, if necessary, with a solvent at ambient temperature.

5. Refractories can be impregnated in the same manner with liquid resol type phenolic resin modified with a lignin and/or molasses which may be diluted with a compatible organic solvent.

6. Refractories can also be impregnated with a novolac type phenolic resin modified with a lignin and/or molasses similarly as described above, which has been dissolved in a compatible organic solvent.

7. It is of course, possible to use the phenolic resins modified with a lignin and/or molasses together with tars, pitches or general phenolic resins and furan resins which have been used heretofore.

In the foregoing procedures advantageously from about 0 to about 500 parts by weight of water or aqueous organic solvent per 100 parts by weight of resin binder is employed to provide a moldable mass. Generally the amount of refractory material used is about 0.5 to about 1,000 parts by weight per 100 parts by weight of the lignin or molasses reactant.

The present invention will be illustrated more concretely by means of examples, which do not limit the scope of the invention. Parts and percentages in the examples are given by weight unless otherwise indicated.

EXAMPLE 1

Processes for the preparation of phenolic resins (A) through (I) modified with a lignin and/or molasses (hereinafter referred to as "modified phenolic resins") used in Examples 2, 3 and 4 will be shown.

1. 100 Parts of phenol, 100 parts of sulfite pulp lignin and 100 parts of molasses were reacted together in the presence of sulfuric acid catalyst at 100° C for 4 hours. Thereafter, the reactant product was dehydrated under reduced pressure to obtain a modified phenolic resin of the novolac type with a melting point of 85° C. To 90 parts of the resin thus obtained were added 10 parts of hexamehtylenetetramine and the mixture was pulverized into powder. Resin (A) was thus obtained.

2. To a mixture of 50 parts of phenol, 50 parts of cresol and 200 parts of kraft pulp lignin, 37% aqueous formaldehyde solution was added in a quantity of 0.5 mole as formaldehyde per mole of phenol and cresol. The mixture was subjected to reaction in the presence of hydrochloric acid catalyst. The reaction product was dehydrated under reduced pressure to obtain novolac type modified phenolic resin having a melting point of 95° C. To 93 parts of the resin thus obtained were added 7 parts of hexamethylenetetramine and the entire material was pulverized into powder. Resin (B) was thus obtained.

3. To a mixture of 100 parts of phenol, 50 parts of sulfite pulp lignin and 300 parts of molasses, 80% paraformaldehyde was added in a quantity of 1.0 mole as formaldehyde per mole of phenol. The mixture was subjected to reaction in the presence of sodium hydroxide catalyst at 80° C for 2 hours. The reaction product was dehydrated under reduced pressure to obtain a liquid modified phenolic resin (C) of resol type having a viscosity of 20 poises at 25° C.

4. To a mixture of 80 parts of phenol, 20 parts of cresol and 150 parts of sulfite pulp lignin, 37% aqueous formaldehyde solution was added in a quantity of 2.2 moles as formaldehyde per mole of phenol and cresol. The mixture was subjected to reaction in the presence of sodium hydroxide catalyst at 100° C for 3 hours. To the reaction mixture was further added 50 parts of sulfite pulp lignin, then dehydrated under reduced pressure and diluted with methanol to obtain a liquid modified resol type phenolic resin (D) having a viscosity of 10 poises at 25° C.

5. To a mixture of 100 parts of phenol and 150 parts of molasses, 80% paraformaldehyde was added in a quantity of 0.6 mole as formaldehyde per mole of phenol. The mixture was subjected to reaction in the presence of oxalic acid catalyst at 100° C for 4 hours. The reaction product was dehydrated under reduced pressure to obtain a phenolic resin of novolac type having a melting point of 80° C. To 90 parts of the resin were added 10 parts of hexamethylenetetramine and the mixture was pulverized. Powdered resin (E) was thus obtained.

6. To 100 parts of phenol, 37% aqueous formaldehyde solution was added in a quantity of 0.7 mole as formaldehyde per mole of phenol. The mixture was subjected to reaction in the presence of oxalic acid catalyst at 100° C for 2 hours. The reaction product was dehydrated under reduced pressure to obtain a novolac resin. Then, 50 parts of molasses and 150 parts of sulfite pulp lignin were added thereto and the mixture was stirred thoroughly. Aluminum chloride as catalyst was added to the mixture. The mixture was then dehydrated under atmospheric pressure. The entire material was dissolved in ethylene glycol. After cooling, 30 parts of hexamehtylenetetramine were added thereto and the mixture was stirred thoroughly to obtain a liquid modified novolac type phenolic resin (F) having a viscosity of 18 poises at 25° C.

7. To a mixture of 100 parts of phenol and 400 parts of molasses, 37% aqueous formaldehyde solution was added in a quantity of 0.9 mole as formaldehyde per mole of phenol. The mixture was subjected to reaction in the presence of triethylamine catalyst at 80° C for 3 hours. The reaction product was dehydrated under reduced pressure to obtain a modified resol type phenolic resin (G) having a viscosity of 12 poises at 25° C.

8. To 100 parts of phenol, 37% aqueous formaldehyde solution was added in a quantity of 0.8 mole as formaldehyde per mole of phenol. The mixture was subjected to reaction in the presence of a sulfuric acid catalyst to obtain a novolac type phenolic resin precondensate. Then, 300 parts of kraft pulp lignin were added thereto and the mixture was stirred thoroughly. The mixture was then dehydrated under atmospheric pressure to obtain a modified novolac type phenolic resin having a melting point of 109° C. To 88 parts of the resin were added 12 parts of hexamethylenetetramine and the resulting mixture was pulverized to obtain a powdered resin (H).

9. To a mixture of 100 parts of phenol and 450 parts of sulfite pulp lignin, 37% aqueous formaldehyde solution was added in a quantity of 1.3 moles as formaldehyde per mole of phenol. The mixture was subjected to reaction in the presence of a potassium hydroxide catalyst at 100° C for 1 hour. The reaction product was dehydrated under reduced pressure. Thereafter, the product was stirred thoroughly together with ethylene glycol to obtain a liquid modified resol type phenolic resin (I) having a viscosity of 55 poises at 25° C.

EXAMPLE 2

Graphite as a refractory material was kneaded together with modified phenolic resins (A) — (D) shown in Example 1 as binder in proportions shown in Table 1. Kneading temperatures in the case of modified phenolic resins and general phenolic resins was at ambient temperature but in the case of pitches and tars was 80° C (under heating). The resulting clay-like mass was molded under a molding pressure of 300 Kg/cm$^2$ to obtain preforms of a size of 15 m/m × 25 m/m × 120 m/m. The preforms were heated slowly from room temperature to 1,200° C in coke breeze. The preforms were kept at 1,200° C for 5 hours and then cooled slowly to obtain carbonized moldings. Results of tests on physical properties of the products are shown in Table 1.

Tests of the moldings were effected according to JIS R-2205 and JIS R-2213. The results shown in Table 1 suggest that when a binder of the present invention is used, apparent porosity after the carbonization is smaller than in the comparative examples (conventional binders), i.e. moldings according to the present invention are more dense, and strengths thereof at ambient and high temperature are higher than the comparative ones by more than 30%.

EXAMPLE 3

Components in a proportion shown in Table 2 were kneaded together, magnesia clinker being used as a refractory material and modified phenolic resins (E-G) shown in Example 1 were used as binder. In case of using modified phenolic resin (E) (powder), a wetting agent (tricresyl phosphate) and the refractory material were first blended together and then resin (E) was added thereto and blending was continued at ambient temperature. In case of using modified phenolic resin (F) or (G) (liquid), the resin was kneaded simply together with the refractory material at ambient temperature. Also, in case of using general phenolic resins (liquid), the resin was kneaded simply together with the refractory material at ambient temperature. Also, in case of using general phenolic resins (liquid), blending was effected at ambient temperature. In case of using a tar, blending was effected under heating at 60° C. The resulting clay-like mass was molded under a molding pressure of 500 Kg/cm$^2$ to obtain preforms of a size of 15 m/m × 25 m/m × 120 m/m. The preforms were dried at a temperature of 160° C for 10 hours. The product thus obtained must be classified as unfired refractories. The resin which has been merely heated and thereby hardened acts as a bond and, if it is used actually at high temperature under a reducing or non-oxidizing atmosphere, carbon bonds are formed therein. For assessing the practical properties of the moldings, the moldings dried in coke breeze was fired at 400°, 600° and 1,000° C for 3 hours and their physical properties were determined.

Table 1

| Composition | Present invention | | | | Comparative Examples (Conventional) | | | |
| --- | --- | --- | --- | --- | --- | --- | --- | --- |
| Graphite (parts) | 100 | | 100 | | 100 | | 100 | |
| Binder | [A] | [C] | [B] | [D] | Powdered phenolic resin | Liquid phenolic resin | Powdered pitch | Liquid tar |
| Amount of binder (%) | 10 | 10 | 5 | 15 | 10 | 10 | 10 | 10 |
| Physical properties | | | | | | | | |
| Apparent porosity (%) | 17.5 | | 16.8 | | 19.8 | | 23.5 | |
| Bulk density (—) | 1.69 | | 1.68 | | 1.60 | | 1.55 | |
| Bending strength(Kg/cm$^2$) | 120 | | 122 | | 90 | | 69 | |
| Hot bending strength at (1200° C) (Kg/cm$^2$) | 85 | | 88 | | 61 | | 54 | |

Table 2

| | Present invention | | | Comparative Examples (Conventional) | |
| --- | --- | --- | --- | --- | --- |
| Refractory material | | | | | |
| Magnesia clinker | 95 parts | 95 parts | 95 parts | 95 parts | 95 parts |
| Carbon | 5 parts | 5 parts | 5 parts | 5 parts | 5 parts |
| Binder | | | | | |
| Kinds | E | F | G | General phenolic resin resol type | Tar |
| Amount | 10 | 10 | 10 | 10 | 10 |
| Properties of dried and hardened moldings | | | | | |
| Apparent porosity (%) | 4.8 | 4.6 | 4.0 | 5.8 | 6.7 |
| Bulk density(—) | 2.60 | 2.65 | 2.61 | 2.55 | 2.52 |
| Bending strength (Kg/cm$^2$) | 395 | 372 | 402 | 358 | 102 |
| Properties of carbonized products | | | | | |
| Bending strength (Kg/cm$^2$) | | | | | |
| 400° C | 299 | 304 | 372 | 215 | 97 |
| 600° C | 245 | 249 | 368 | 183 | 83 |

Table 2-continued

|  | Present invention | | | Comparative Examples (Conventional) | |
|---|---|---|---|---|---|
| 1000° C | 267 | 235 | 312 | 165 | 92 |

The moldings were tested according to JIS R-2205 and JIS R-2213. The results shown in Table 2 indicate that the binders of the present invention impart a high strength to the moldings which have been dried and thereby hardened, and a higher strength at high temperature when employed for actual use as compared with those of conventional binders. Thus, the defect of conventional binders lacking strength, namely the carbon bonding power, at high temperature can be surmounted. Further, binders according to the present invention do not have serious defects accompanying conventional binders: low strength and slow hardening at low and medium temperature range (400°-600° C). The binders according to the present invention have thus excellent properties desirable for binders of unfired refractories which properties have not been realized heretofore.

EXAMPLE 4

A clay-like mass (refractories of indefinite shape, for example, as ramming material or sealants) was obtained from carbon (coke powder) as refractory material and modified phenolic resin (H) or (I) shown in Example 1 as binder of the carbon by kneading them at ambient temperature. The mixture was then pressed into lumps with a rammer to obtain preforms of a size of 50 m/m × 50 m/m. Physical properties of the preforms were compared with those of conventional binders. Proportions of the components were as shown in Table 3. In case of modified phenolic resin (H), a wetting agent (polyethylene glycol) and the refractory material were first kneaded together and then resin (H) was added thereto and the kneading was continued. The results of the test are shown in Table 3. In the test, the resulting moldings were fired in coke breeze at temperatures of 250°, 400°, 600° and 1,000° C for 10 hours and the compressive strengths thereof were determined.

Table 3

| Binder | Present invention | | Conventional | | | | |
|---|---|---|---|---|---|---|---|
|  | [H] | [I] | General resol type phenolic resin | Furan resin | Tar | Pulp waste liquor | Molasses |
| Amount (%) | 5 | 5 | 5 | 5 | 5 | 5 | 5 |
| Compressive strength(Kg/cm$^2$) | | | | | | | |
| Ambient temp.(unfired) | 1.9 | 2.5 | 1.2 | 0.9 | 0.7 | 1.4 | 1.2 |
| 250° C | 70 | 88 | 67 | 49 | 13 | 10 | 9 |
| 400° C | 62 | 82 | 50 | 33 | 7 | 6 | 6 |
| 600° C | 69 | 74 | 44 | 29 | 8 | 5 | 5 |
| 1,000° C | 59 | 78 | 35 | 17 | 14 | 2 | 1 |

The above test was carried out according to JIS R-2206. The results shown in Table 3 show that the binders prepared according to the present invention have excellent properties which cannot be expected in conventional binders, namely the former binders have higher unfired strength (i.e. caking power) as compared with that of conventional binders and strengths thereof are high and uniform at temperatures ranging from low temperature (250° C) to high temperature (1,000° C). In the use of the modified phenolic resins as a binder of refractories for indefinite shape as in this example, it is, of course, possible to obtain a proper working property (such as viscosity of the clay-like mass) by controlling the amount of the resin and wetting agent. Further, modified phenolic resins have produced more desirable results also as an impregnating agent as compared with conventional binders.

What is claimed is:

1. In a solid refractory composition comprising an inorganic refractory material and a substantially carbonized organic resin as a carbonaceous binder therefor, the improvement wherein the resin comprises a condensate resin of a phenol and an aldehyde chemically modified by reaction under heating with an extending agent selected from the group consisting of sulfite pulp lignin, kraft pulp lignin, molasses and mixtures thereof, the amount of lignin employed being about 5 to about 300 parts by weight per hundred parts by weight of the phenol, the amount of molasses employed being about 5 to about 500 parts by weight per hundred parts by weight of the phenol, and the amount of refractory material employed being about 0.5 to about 1,000 parts by weight per 100 parts by weight of extending agent.

2. The composition as claimed in claim 1 wherein the phenol-aldehyde resin is a novolac resin.

3. The composition as claimed in claim 2 wherein the extending agent is incorporated in the composition by reaction with the phenol, in the presence of a catalytic amount of an acid catalyst for said reaction, prior to condensation of the phenol with the aldehyde.

4. The composition as claimed in claim 2 wherein the extending agent is incorporated in the composition by reaction with the phenol-aldehyde condensate in the presence of a catalytic amount of an acid catalyst for said reaction.

5. The composition as claimed in claim 1 wherein the phenol-aldehyde condensate is a resol resin and the extending agent is incorporated in the composition by reaction with the phenol in the presence of a catalytic amount of an acid catalyst for said reaction prior to condensation of the phenol with the aldehyde.

6. The composition as claimed in claim 1 wherein the refractory material is selected from the group consisting of silica, clay, alumina, carbon, magnesia and dolomite, the aldehyde reactant is formaldehyde and the phenol reactant is selected from the group consisting of phenol and alkyl phenols having 1 to 4 carbon atoms in the alkyl substituent.

7. The composition of claim 6 wherein the phenol reactant is phenol and the extending agent is molasses.

8. The composition of claim 6 wherein the phenol reactant is phenol and the extending agent is a lignin selected from the group consisting of sulfite pulp lignin and kraft pulp lignin.

9. The process of producing a solid molded refractory composition comprising inorganic refractory material and a carbonaceous binder therefor which comprises the steps of 1) forming a mixture of a particulate inorganic refractory material and an organic resin in the presence of a volatile organic or inorganic liquid, wherein said refractory material is substantially insoluble, in an amount sufficient to provide a plastic mixture, said organic resin comprising the condensate resin of phenol and an aldehyde chemically modified by reaction under heating with an extending agent selected from the group consisting of sulfite pulp lignin, kraft pulp lignin, molasses and mixtures thereof, the amount of lignin employed being about 5 to about 300 parts by weight per hundred parts by weight of the phenol and the amount of molasses being about 5 to about 500 parts by weight per hundred parts by weight of the phenol, 2) molding the resultant plastic mixture to a desired shape, 3) removing said liquid from said mixture by evaporation to harden the resin, and 4) calcining said mixture at an elevated temperature under a non-oxidizing atmosphere to carbonize substantially all of said resin and obtain said refractory composition.

10. The process as claimed in claim 9 wherein the solid molded refractory composition product is calcined at about 400° to about 1200° Centigrade to carbonize the resin.

11. A solid molded refractory composition impregnated with a condensate resin of a phenol and an aldehyde chemically modified by reaction under heating with an extending agent selected from the group consisting of sulfite pulp lignin, kraft pulp lignin, molasses and mixtures thereof, the amount of lignin employed being about 5 to about 300 parts by weight per hundred parts by weight of the phenol and the amount of molasses employed being about 5 to about 500 parts by weight per hundred parts by weight of the phenol.

* * * * *

UNITED STATES PATENT AND TRADEMARK OFFICE
CERTIFICATE OF CORRECTION

PATENT NO. : 4,058,403
DATED : November 15, 1977
INVENTOR(S) : Kyohei Funabiki et al.

It is certified that error appears in the above—identified patent and that said Letters Patent are hereby corrected as shown below:

For "Assignee: Hooker Chemicals & Plastics Corp.,Niagara Falls, N.Y." read "Assignee: Sumitomo Durez Company, Ltd., Tokyo, Japan".

Signed and Sealed this

Sixth Day of June 1978

[SEAL]

Attest:

RUTH C. MASON
*Attesting Officer*

DONALD W. BANNER
*Commissioner of Patents and Trademarks*